(12) United States Patent
Konertz et al.

(10) Patent No.: US 8,959,358 B2
(45) Date of Patent: Feb. 17, 2015

(54) USER-BASED IDENTIFICATION SYSTEM FOR SOCIAL NETWORKS

(75) Inventors: Anne Katrin Konertz, Solana Beach, CA (US); Niccolo A. Padovani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/547,989

(22) Filed: Jul. 12, 2012

(65) Prior Publication Data

US 2013/0305336 A1 Nov. 14, 2013

Related U.S. Application Data

(60) Provisional application No. 61/643,980, filed on May 8, 2012.

(51) Int. Cl.
*H04L 29/06* (2006.01)
*G06F 21/32* (2013.01)

(52) U.S. Cl.
CPC .................................... *G06F 21/32* (2013.01)
USPC ............................................. 713/186; 726/7

(58) Field of Classification Search
USPC ......................................................... 713/186
See application file for complete search history.

(56) References Cited

U.S. PATENT DOCUMENTS

| | | | |
|---|---|---|---|
| 2009/0080635 A1 | 3/2009 | Altberg et al. | |
| 2009/0265639 A1* | 10/2009 | Shuster | 715/747 |
| 2010/0046842 A1 | 2/2010 | Conwell | |
| 2010/0250676 A1 | 9/2010 | Ufford et al. | |
| 2010/0281520 A1 | 11/2010 | Deguchi | |
| 2010/0293476 A1* | 11/2010 | Rosenblum et al. | 715/753 |
| 2011/0093942 A1 | 4/2011 | Koster et al. | |
| 2011/0209192 A1 | 8/2011 | Leclerc Greer et al. | |
| 2013/0073974 A1* | 3/2013 | Bladel et al. | 715/739 |

OTHER PUBLICATIONS

Chang, et al., "Creating Safe and Trusted Social Networks with Biometric User Authentication," Ethics and Policy of Biometrics. Third International Conference on Ethics and Policy of Biometrics and International Data Sharing, pp. 89-95, Germany, 2010.
International Search Report and Written Opinion—PCT/US2013/037014—ISA/EPO—Jul. 2, 2013.

\* cited by examiner

*Primary Examiner* — Yogesh Paliwal (74) *Attorney, Agent, or Firm* — Kilpatrick Townsend & Stockton LLP (57) ABSTRACT

Techniques disclosed herein provide for verifying the identity of a prospective social network member using an authentication process in which one or more existing members of the social network who are knowledgeable of the identity of the prospective member communicate with the prospective member in real time. During the real-time communication, biometric information of the prospective member can be associated with a profile for the prospective member. During or after the real-time communication, the existing member(s) can verify the identity of the prospective member. Once the prospective member's identity has been properly verified, the prospective member can be granted access to the social network.

37 Claims, 5 Drawing Sheets

USER-BASED IDENTIFICATION SYSTEM FOR SOCIAL NETWORKS

CROSS-REFERENCE TO RELATED APPLICATION

The present application claims priority to U.S. Provisional Application No. 61/643,980 filed May 8, 2012, and titled "User-Based Identification System for Social Networks," which is incorporated by reference in its entirety for all purposes.

BACKGROUND

Online social networks are ubiquitous in today's society, enabling hundreds of millions of users to create and build relationships electronically via the Internet using any of a variety of user devices (e.g., personal computers, laptops, tablets, smart phones, etc.). Users may join a social network using registration process. But many social networks allow users to register anonymously or with limited means of verifying the identity of registrants, thereby failing to prevent many users from registering with false information. Although anonymity is welcomed in some social networks, accurate identification can be crucial in others. On-line social networks that facilitate in-person meetings between users, for example, have an interest in ensuring accurate information is collected—especially if its users include minors.

SUMMARY

Techniques disclosed herein provide for verifying the identity of a prospective social network member using an authentication process in which one or more existing members of the social network who are knowledgeable of the identity of the prospective member communicate with the prospective member in real time. During the real-time communication, biometric information of the prospective member can be associated with a profile for the prospective member. During or after the real-time communication, the existing member(s) can verify the identity of the prospective member. Once the prospective member's identity has been properly verified, the prospective member can be granted access to the social network.

An example method of authentication based on real-time communication, according to the disclosure, can include accessing a profile comprising information regarding a first person, and collecting a first set of biometric information of the first person during the real-time communication between the first person and a second person, where the second person has a threshold level of authentication. The method further includes associating, with a processing unit, the first set of biometric information with the profile, receiving, from the second person, an indication regarding an identity of the first person, and associating, with the processing unit, a first level of authentication with the profile based, at least in part, on the indication regarding the identity of the first person.

The example method of authentication based on real-time communication can include one or more of the following features. Creating, with the processing unit, the profile. The first set of biometric information can include at least one of audio information, or video information. The real-time communication can be initiated, at least in part, by an invitation to join a social network sent by the second person to the first person. The real-time communication can be initiated, at least in part, by an invitation to join a social network sent from a third person to the first person. Associating a password with the profile. Receiving, from a third person, a second indication regarding the identity of the first person, where the third person has at least the threshold level of authentication, and associating a second level of authentication with the profile based, at least in part, on the second indication regarding the identity of the first person. Prompting, during the real-time communication, either or both the first person or the second person to perform an action during the real-time communication. The action can comprise saying a word or phrase. Receiving, after the real-time communication, a second set of biometric information of the first person, comparing the second set of biometric information with the first set of biometric information associated with the profile to obtain a comparison result, and granting access to the profile based, at least in part, on the comparison result.

An example system for providing authentication based on real-time communication, according to the disclosure, can include means for accessing a profile comprising information regarding a first person, and means for collecting a first set of biometric information of the first person during the real-time communication between the first person and a second person, where the second person has a threshold level of authentication. The example system also includes means for associating the first set of biometric information with the profile means for receiving, from the second person, an indication regarding an identity of the first person; and means for associating a first level of authentication with the profile based, at least in part, on the indication regarding the identity of the first person.

The example system for providing authentication based on real-time communication can include one or more of the following features. Means for creating the profile. The means for collecting the first set of biometric information can include means for collecting at least one of audio information, or video information. Means for enabling a third person to send an invitation to join a social network to the first person. Means for associating a password with the profile. Means for receiving, from a third person, a second indication regarding the identity of the first person, where the third person has at least the threshold level of authentication, and associating a second level of authentication with the profile based, at least in part, on the second indication regarding the identity of the first person. Means for prompting, during the real-time communication, either or both the first person or the second person to perform an action during the real-time communication. Means for receiving, after the real-time communication, a second set of biometric information of the first person, comparing the second set of biometric information with the first set of biometric information associated with the profile to obtain a comparison result, and granting access to the profile based, at least in part, on the comparison result.

An example device for providing authentication based on real-time communication, the device comprising a communication interface and one or more processors coupled to the communication interface. The one or more processors are configured to access a profile comprising information regarding a first person, collect, via the communication interface, a first set of biometric information of the first person during real-time communication between the first person and a second person. The second person has a threshold level of authentication. The one or more processors are further configured to associate the first set of biometric information with the profile, receive, from the second person via the communication interface, an indication regarding an identity of the first person, and associate a first level of authentication with the profile based, at least in part, on the indication regarding the identity of the first person.

The example device for providing authentication based on real-time communication can include one or more of the following features. The one or more processors can be further configured to create the profile. The first set of biometric information can include at least one of audio information, or video information. The one or more processors can be further configured to initiate the real-time communication by enabling the second person to send an invitation to join a social network to the first person. The one or more processors can be further configured to initiate the real-time communication by enabling a third person to send an invitation to join a social network to the first person. The one or more processors can be further configured to associate a password with the profile. The one or more processors can be further configured to receive, from a third person, a second indication regarding the identity of the first person, where the third person has at least the threshold level of authentication, and associate a second level of authentication with the profile based, at least in part, on the second indication regarding the identity of the first person. The one or more processors can be further configured to prompt, during the real-time communication, either or both the first person or the second person to perform an action during the real-time communication. The one or more processors can be further configured to receive, after the real-time communication, a second set of biometric information of the first person, compare the second set of biometric information with the first set of biometric information associated with the profile to obtain a comparison result, and grant access to the profile based, at least in part, on the comparison result.

An example computer-readable medium having instructions embedded thereon for providing authentication based on real-time communication, according to the disclosure, can include computer-executable code for accessing a profile comprising information regarding a first person, and collecting a first set of biometric information of the first person during real-time communication between the first person and a second person, where the second person has a threshold level of authentication. The computer-readable medium also includes computer-executable code for associating the first set of biometric information with the profile, receiving, from the second person, an indication regarding an identity of the first person, and associating a first level of authentication with the profile based, at least in part, on the indication regarding the identity of the first person.

The example the computer-readable medium can include one or more of the following features. The instructions can further include computer-executable code for creating the profile. The code for collecting the first set of biometric information can include code for collecting at least one of audio information, or video information. The instructions further include computer-executable code for enabling the second person to send an invitation to join a social network to the first person. The instructions can further include computer-executable code for enabling a third person to send an invitation to join a social network to the first person. The instructions can further include computer-executable code for associating a password with the profile. The instructions can further include computer-executable code for receiving, from a third person, a second indication regarding the identity of the first person, where the third person has at least the threshold level of authentication, and associating a second level of authentication with the profile based, at least in part, on the second indication regarding the identity of the first person. The instructions can further include computer-executable code for prompting, during the real-time communication, either or both the first person or the second person to perform an action during the real-time communication. The instructions can further include computer-executable code for receiving, after the real-time communication, a second set of biometric information of the first person, comparing the second set of biometric information with the first set of biometric information associated with the profile to obtain a comparison result, and granting access to the profile based, at least in part, on the comparison result.

Items and/or techniques described herein may provide one or more of the following capabilities, as well as other capabilities not mentioned. Increased accuracy of user profile information. Increased security to the social network and its members. Multiple authentication levels enabling a social network to provide varying degrees of functionality to users, based on the users' respective authentication levels. While at least one item/technique-effect pair has been described, it may be possible for a noted effect to be achieved by means other than that noted, and a noted item/technique may not necessarily yield the noted effect.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of the present invention are directed toward modes of online and/or electronic authentication. The registration process of social networks (such as Facebook®, Twitter®, etc.) often allows users to register anonymously using false information. Although anonymity is welcomed in some social networks, accurate identification can be crucial in others. On-line social networks that facilitate in-person meetings between users, for example, have an interest in ensuring accurate information is collected—especially if its users include minors. Techniques provided herein can help reduce the risk posed to social network members by those who would attempt to mislead them through fraudulent profile information. It can be noted that, although examples provided herein discuss the invention as applied to social networks, the functionality described herein can be extended to other electronic and/or online authentication systems.

Figure 1:
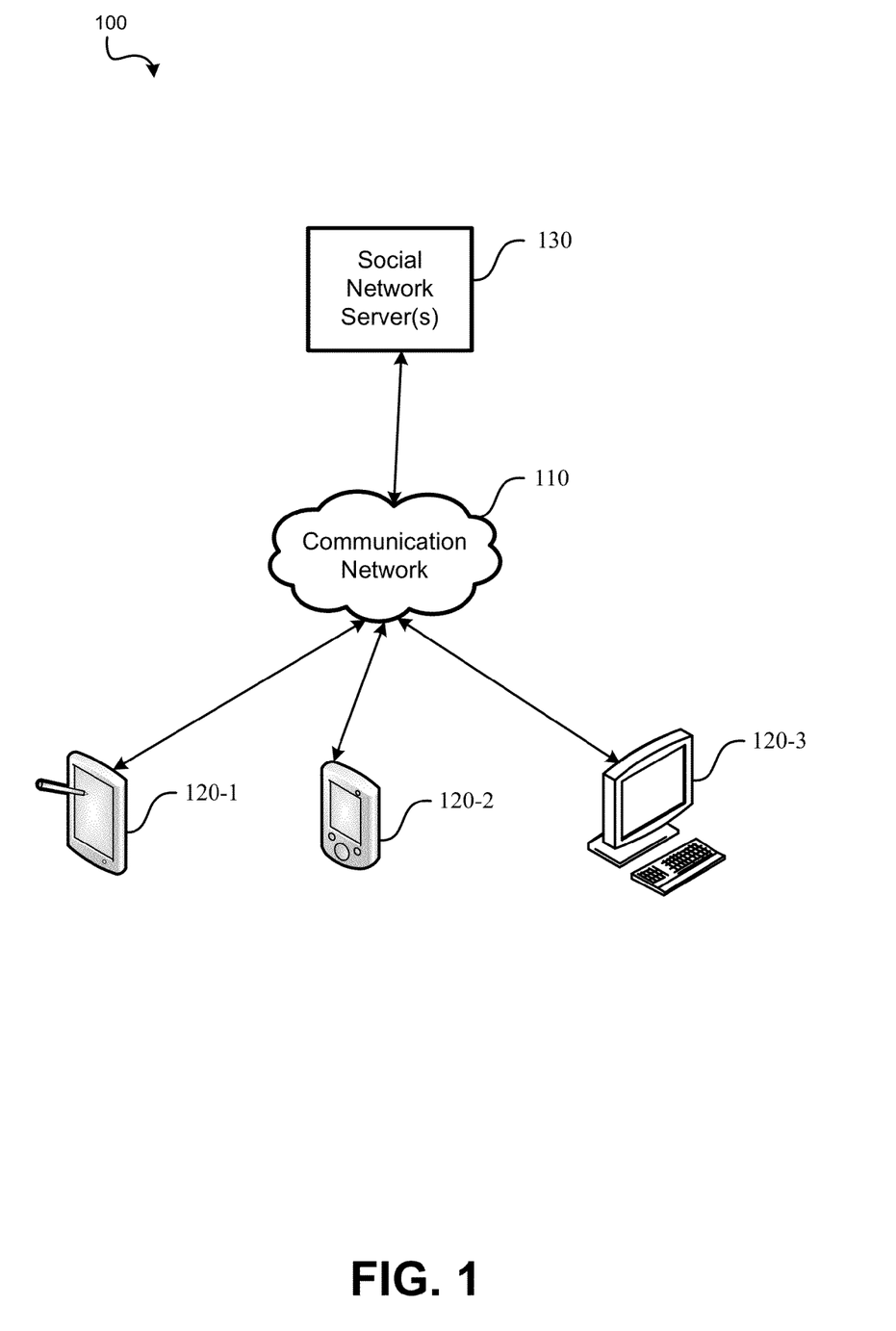
FIG. 1 is a simplified diagram of components of a social network, according to an embodiment of the present invention.

FIG. 1 is a simplified diagram of components of a social network 100. Various electronic devices 120 can allow social network members to access and/or contribute to the social network 100 via a communication network 110, which is communicatively linked with social network server(s) 130. Depending on desired functionality, electronic devices 120 can include any of a variety of devices communicatively linked with the communication network 110, such a tablet computer 120-1, mobile phone 120-2, personal computer 120-3, cell phone, e-reader, personal media player, and the like.

The communication network 110 enables communication between other components of the social network 100. The communication network 110 can comprise any combination of a variety of data communication systems, for example, cable, satellite, wireless/cellular, or Internet systems, or the like, utilizing various technologies and/or protocols, such as radio frequency (RF), optical, satellite, coaxial cable, Ethernet, cellular, twisted pair, other wired and wireless technologies, and the like. The communication network 110 type can comprise packet- and/or circuit-type switching, and can include one or more open, closed, public, and/or private networks, including the Internet, depending on desired functionality, cost concerns, and other factors.

The social network server(s) 130 can comprise one or more computer systems (as described in more detail herein below) configured to authenticate users, store user information, host and/or manage user-based content, and more. Depending on desired functionality, the social network server(s) 130 can communicate with the electronic devices 120 via an Internet browser and/or specialized software application executed on the electronic devices 120.

As indicated above, many social networks 100 have limited means for correctly identifying members of the social network 100. While a social network 100 may offer password-protected member profiles to help authenticate an existing user, these passwords may be hacked and/or otherwise compromised, and they offer no identity verification or other authentication when a member first joins the social network. As provided herein, embodiments of the invention utilize crowdsourcing and real-time communication to provide identification/authentication of a member when the member first joins the social network.

Figure 2:
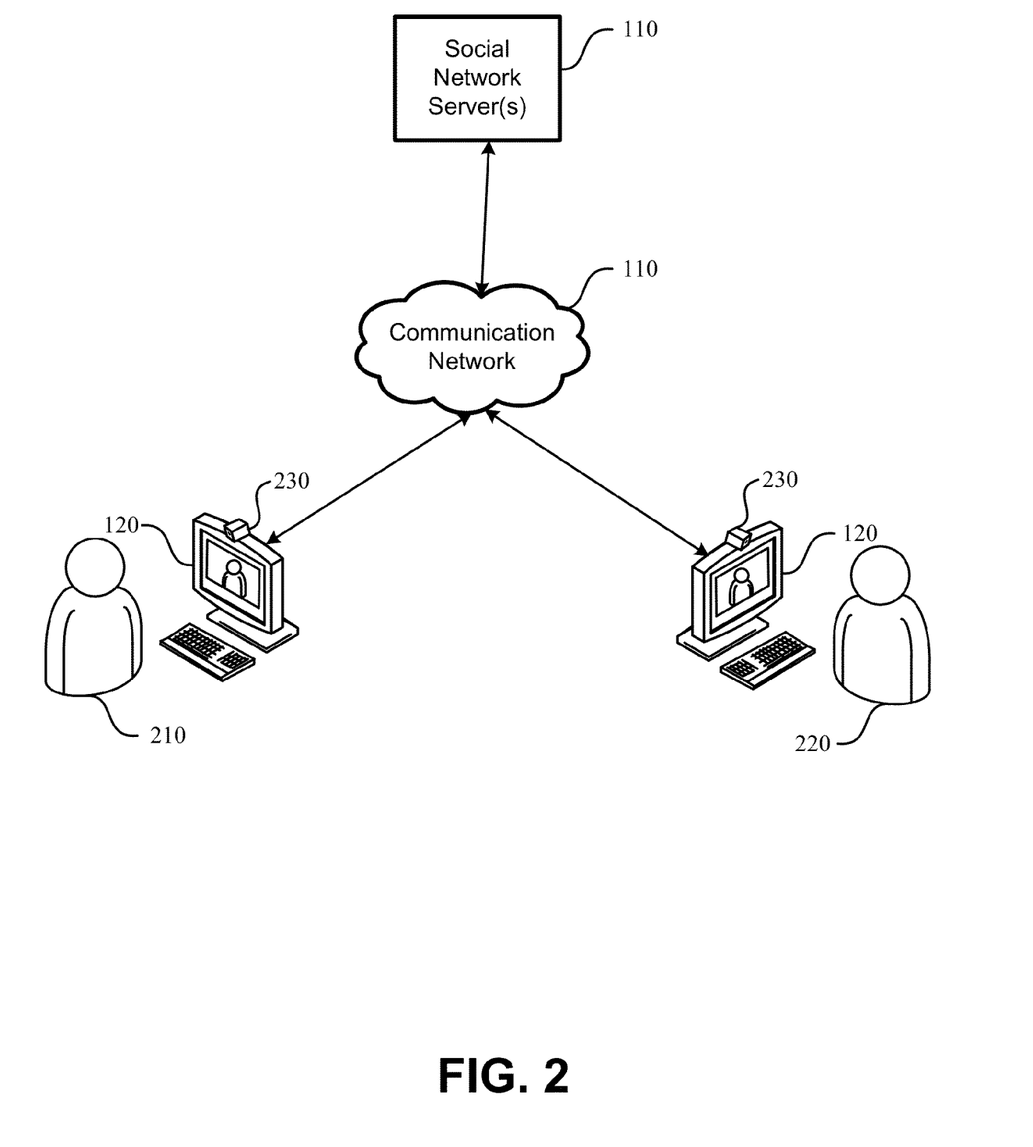
FIG. 2 is a simplified illustration demonstrating how various components of a social network can be utilized to implement an identification system, according to one embodiment.

FIG. 2 is a simplified illustration demonstrating how various components of the social network can be utilized to implement these techniques, according to one embodiment. An authentication process can involve an existing member 210 of the social network 100 who conducts a video chat or other real-time communication using electronic devices 120 connected via communication network 110 to authenticate a prospective member 220. The real-time communication may be initiated, for example, when the prospective member 220 accepts a communication invitation from the existing member, which can be sent via the social network 100. During the communication, the electronic device 120 can collect biometric information (e.g., voice, and/or physical features) and/or other identifying information of the prospective member using a camera 230, microphone, and/or other sensors. This information can be communicated to the social network server(s) 130, which can and associate the information with a profile for the prospective member 220 during and/or after the real-time communication. During or after the video chat, the existing member 210 can complete an authentication process by verifying the identity of the prospective member 220.

Figure 3:
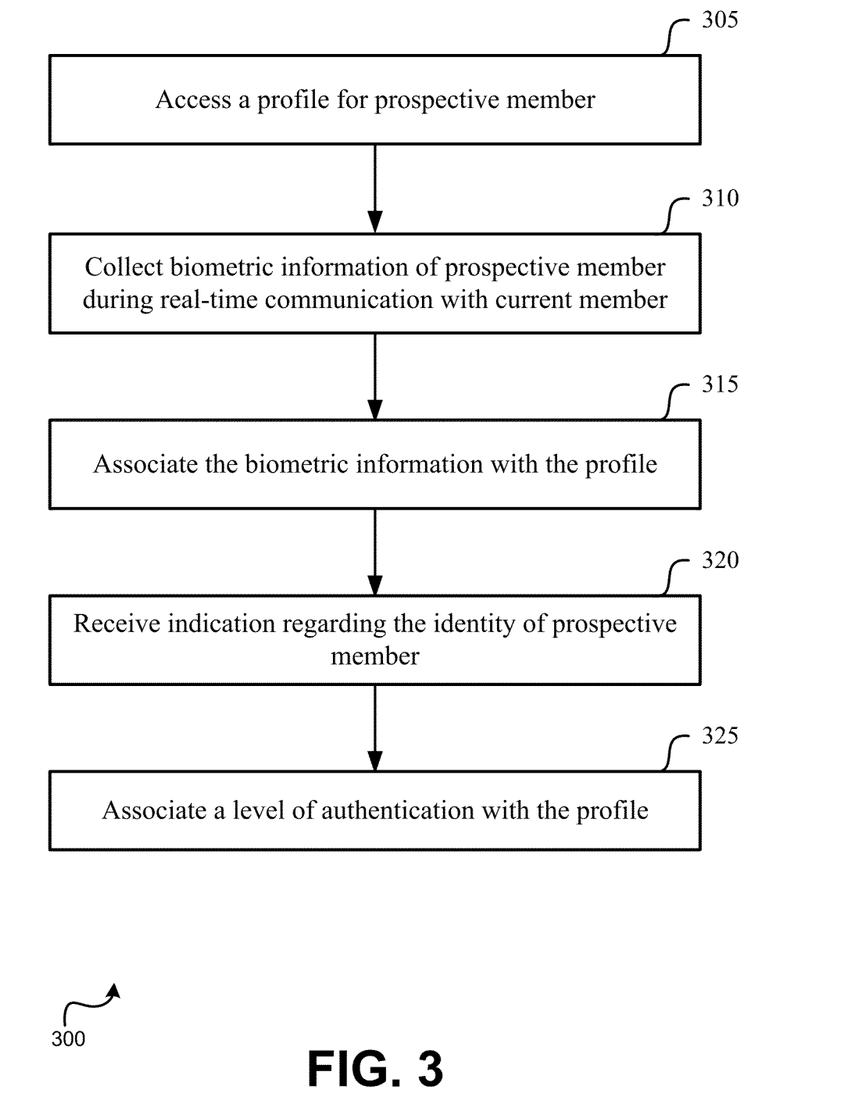
FIG. 3 is a flow diagram illustrating an embodiment of an online and/or electronic authentication process.

FIG. 3 is a flow diagram illustrating an embodiment of an online and/or electronic authentication method 300, which can be performed, for example, by software and/or hardware of the social network server(s) 130 and/or electronic devices 120 of FIGS. 1-2. At block 305, a profile for the prospective member is accessed. The profile information can include information regarding a prospective member 220, including identifying information (name, birth date, address, phone number, username, password, email address, etc.). The profile information can be provided by the prospective member 220, existing member 210, and/or other entity during an initial profile setup process. In some embodiments, for example, a prospective member 220 may upload information on a registration website of the social network 100. Social network server(s) 130 and/or other system to which the social network server(s) 130 is communicatively linked may create, store, and/or access the profile. Thus, structure for performing block 305 and/or creating the profile can include one or more processors, memory, communication interface(s), and/or any of the structure discussed generally in reference to method 300.

At block 310, biometric information of the prospective member 220 is collected during a real-time communication with an existing member 210. As suggested above, the existing member 210 may initiate the process by sending a real-time communication request (e.g., video chat request) to the prospective member 220. The invitation may be sent, for example, to an email address, instant messaging account, or other communication medium, which may be specified in the profile of the prospective member 220 and/or indicated in the existing member's request. The invitation response can be sent in a similar fashion. In some embodiments, for example, the prospective member 220 could go online and post a "ready to join" message. Furthermore, the prospective member 220 may be able to select members of the social network (besides or in addition to the existing member 210 who sent the invitation) who know or might know the prospective member 220 in the hope that at least one person (who may be online) can quickly identify the prospective member 220. In some embodiments, the real-time communication may be facilitated with a web page or other communication means hosted by the social network 100. As such, structure for performing block 310 and/or enabling the invitation to be sent to the prospective member can include one or more processors, memory, communication interface(s), biometric-collecting devices (a camera, microphone, and/or other sensors) and/or processors communicatively linked therewith, and/or any of the structure discussed generally in reference to method 300.

The biometric information (or other identifying information) collected can vary, depending on available biometric sensing structure. For a real-time video chat, for example, video images can be used to collect and process facial (or other physical) features for facial (or other) recognition. Additionally or alternatively, audio can be collected for voice recognition. Other sensors and/or sensing structure can be utilized to collect retina, fingerprint, signature, and/or other distinguishing characteristics. This information may be processed and/or stored by social network server(s) 130, electronic devices 120, and/or other components of the social network.

At block 315, the biometric information is associated with the profile of the prospective member 220. This can, for example, enable the social network 100 to utilize the biometric information for subsequent authentication of the prospective member 220, for example, the prospective member 220 attempts to log on or gain access to the social network 100.

Again, structure for performing block 315 can include one or more processors, memory, communication interface(s), and/or any of the structure discussed generally in reference to method 300.

At block 320, an indication regarding the identity of the prospective member 220 is received. The existing member 210, for example, can provide identifying information during and/or after the real-time communication with the prospective member 220. As an example, after a real-time communication with prospective member 220 "Bob Jones," an existing member 210 may be given a questionnaire or other input interface by which the existing member 210 can verify that the voice, image, and/or other distinguishing characteristics used in the real-time communication belonged to "Bob Jones." In other embodiments, the questionnaire could be simpler, such as a simple identification (e.g., having the existing member 210 provide a simple "yes, this is Bob Jones" or "no, this isn't Bob Jones" answer). Structure for performing block 320 can include one or more processors, memory, communication interface(s), electronic device(s) 120 (and/or processors communicatively liked therewith), and/or any of the structure discussed generally in reference to method 300.

At block 325, after the existing member 210 provides identification, a level of authentication will be associated with the profile of the prospective member 220. The level of authentication can be, for example, enabling the prospective member 220 to login and/or access at least certain portions and/or functions of the social network. In some embodiments, the social network 100 may require authentication from additional existing members before a prospective member 220 is granted access. Some embodiments may have different levels of access corresponding to different levels of authentication, such that a second level of authentication is associated with the prospective member's profile when the prospective member 220 is identified/authenticated by a second existing member, and so on. Additionally or alternatively, the level of authentication associated with the profile of the prospective member 220 may depend on a level of authentication of the existing member 210. For example, a prospective member 220 can be granted a higher level of authentication if his identity is verified by an existing member 210 with a relatively high level of authentication than if his identity is verified by an existing member 210 with a relatively low of authentication. Moreover, a higher level of authentication may be granted where the existing member has a close connection (e.g., family member) with the prospective member than when the connection is not so close (e.g., an acquaintance). An existing member may not be able to send an invitation to a prospective member to join the social network unless the existing member has achieved a threshold level of authentication. In some embodiments, the real-time communication can take place between a multiple prospective members and/or multiple existing members, depending on desired functionality. Structure for performing block 325 can include one or more processors, memory, communication interface(s), and/or any of the structure discussed generally in reference to method 300.

Additionally or alternatively, the real-time communication can be provided in a survey type of post from the existing member 210 which would then allow friends, family, and/or other members of the social network to verify the identity of the prospective member 220. The real-time communication, for example, could be posted on a news feed which asks for a "yes" or "no" authentication response from additional members of the social network. Moreover, the additional members can include a selection of members, such as a group of members chosen by the existing member 210.

Figure 4:
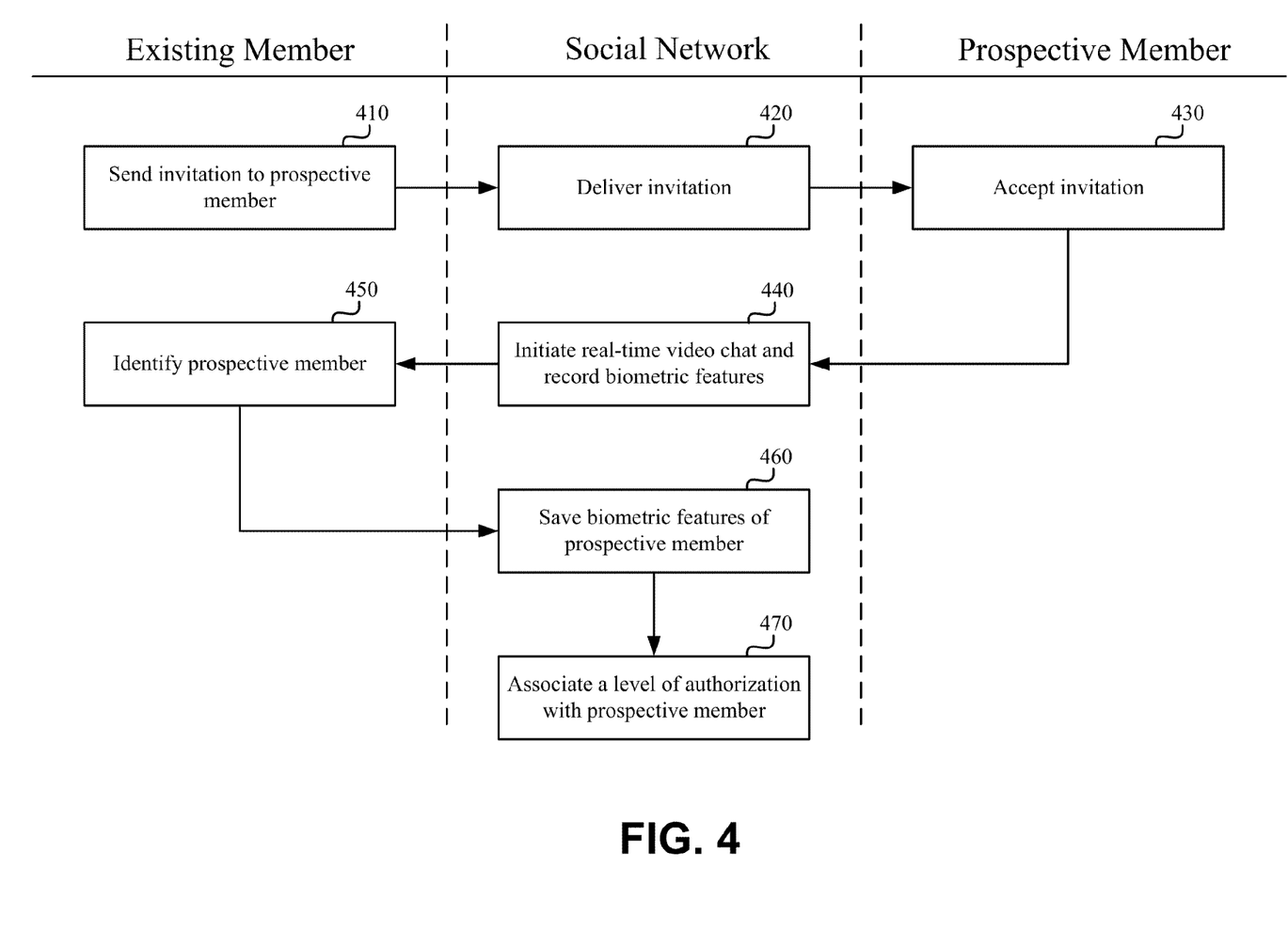
FIG. 4 is a swim-lane diagram illustrating how different tasks of an authentication process can be performed by different entities shown in FIGS. 1-2, according to one embodiment.

FIG. 4 is a swim-lane diagram illustrating how different tasks of an authentication process can be performed by different entities shown in FIGS. 1-2, according to one embodiment. Here, tasks performed by the existing member and prospective member can be performed via electronic devices, such as the electronic devices 120 of FIGS. 1-2. Tasks for the social network can be performed by one or more servers (such as social network server(s) 130 of FIGS. 1-2) executing, for example, software configured to perform the authentication steps shown in FIG. 4. The electronic devices and/or the one or more social network servers can incorporate at least portions of a computer system described herein below in relation to FIG. 5.

At block 410, an existing member sends an invitation to a prospective member to initiate a real-time communication such as a voice chat, video chat, or the like. In alternative embodiments, yet another person may send an invitation to start a real-time communication between the existing member and the prospective member. This can be, for example, another member of the social network that does not have the ability and/or authentication level to authenticate prospective members. In such cases, however, the other member still may be allowed to send an invitation to initiate the real-time communication.

At blocks 420 and 430 respectively, the social network delivers the invitation, and the prospective member accepts the invitation. After which, at block 440, the social network can initiate a real-time chat (or other communication means) and record biometric features of the prospective member. To ensure chat is performed in real time, the social network can prompt the existing member and/or the prospective member via the real-time chat (or other communication means) to perform an action, such as make a particular movement, say a word or phrase, etc. Depending on the functionality of the social network 100, the performance of the action may be automatically verifiable via visual and/or audio recognition systems of the social network.

At block 450, the existing member identifies the prospective member, authenticating, for example, one or more features (voice, appearance, etc.) of the prospective member. At block 460, the social network saves biometric features of the prospective member and subsequently associates a level of authentication with the prospective member at block 470. The biometric features and/or level of authentication can be associated with a profile for the prospective member, which may be created prior to, during, or after the real-time communication.

Subsequently, the prospective member may login to the social network using biometric information. For example, if, during a video chat, the social network collected a first set of images identifying at least some facial features of the prospective member, the prospective member may login to the social network using an electronic device that collects a second set of images of the prospective member's facial features. The social network compares the first and second set of images and allows the prospective member to login if there is a match. Similar functionality can be executed where the biometric information is collected from a single image, an audio recording, or other identifying information. Additionally or alternatively, after the prospective member has been authenticated by an existing member, the prospective member may be allowed to login to the social network using a password associated with a profile for the prospective member, which may be created before, after, or during the real-time communication. Social network server(s) 130 and/or other computing structure can be used to associate the password with the profile.

It should be appreciated that the specific steps illustrated in FIGS. 3-4 provide a examples of methods for authenticating a prospective member of a social network. Alternative embodiments may include alterations to the embodiments shown. For example, alternative embodiments may include saving biometric features of a prospective member and/or creating a profile for the prospective member at different times during the method. Yet other embodiments may include verification without the social network capturing and/or storing biometrics. Furthermore, additional features may be added, removed, or combined depending on the particular applications. One of ordinary skill in the art would recognize many variations, modifications, and alternatives.

Figure 5:
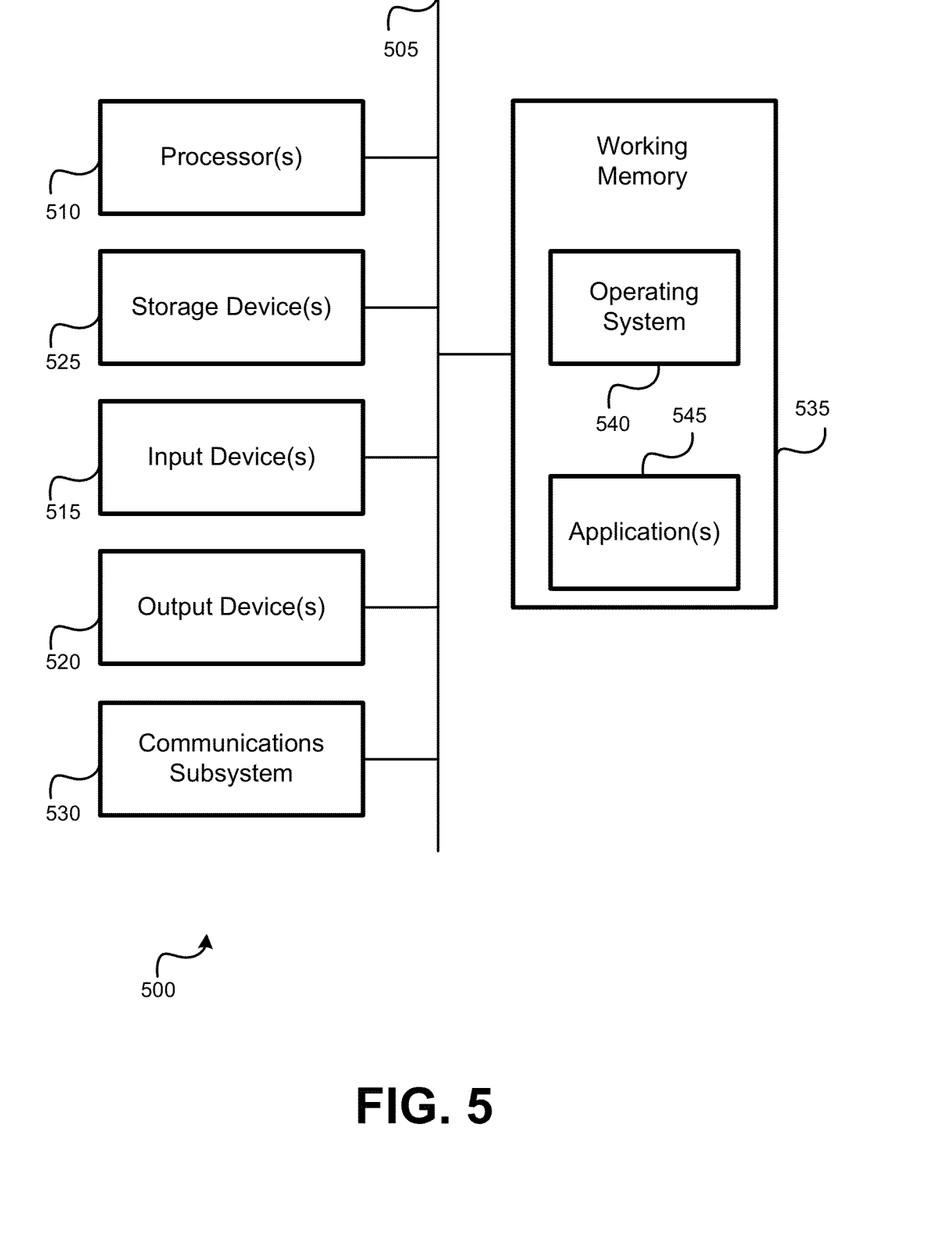
FIG. 5 is an illustration of an embodiment of a computer system, which may be incorporated, at least in part, into devices configured to perform some or all of the methods described herein.

FIG. 5 illustrates an embodiment of a computer system 500, which may be incorporated, at least in part, into devices such as a social network server(s) 110 and/or electronic devices 120 of FIGS. 1-2, and/or other components of the social network described herein. FIG. 5 provides a schematic illustration of one embodiment of a computer system 500 that can perform the methods provided by various other embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit, such as processor(s) 510, which can include without limitation one or more general-purpose processors, one or more special-purpose processors (such as digital signal processing chips, graphics acceleration processors, and/or the like), and/or other processing structure; one or more input devices 515, which can include without limitation a mouse, a keyboard, a camera, a microphone, other biometric sensors, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 530 may include one or more input and/or output communication interfaces to permit data to be exchanged with a network (such as the communication network 110 of FIGS. 1-2), other computer systems, and/or any other electronic devices described herein. Depending on the desired functionality and/or other implementation concerns, a portable electronic device (or similar device) may communicate image and/or other information via the communications subsystem 530. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above, such as those described in relation to FIGS. 3-4, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion, but do not refer to transitory propagating signals. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510 (where the phrases "storage device," "storage medium," and the like do not refer to transitory propagating signals).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of authentication based on real-time communication, the method comprising:
    accessing a profile comprising information regarding a first person;
    collecting a first set of biometric information of the first person during the real-time communication between the first person and a second person, the second person having a threshold level of authentication;
    associating, with a processing unit, the first set of biometric information with the profile;
    receiving, from the second person, an indication regarding an identity of the first person; and
    associating, with the processing unit, a first level of authentication with the profile based, at least in part, on the indication regarding the identity of the first person.

2. The method of claim 1, further comprising creating, with the processing unit, the profile.

3. The method of claim 1, wherein the first set of biometric information includes at least one of:
    audio information, or
    video information.

4. The method of claim 1, wherein the real-time communication is initiated, at least in part, by an invitation to join a social network sent by the second person to the first person.

5. The method of claim 1, wherein the real-time communication is initiated, at least in part, by an invitation to join a social network sent from a third person to the first person.

6. The method of claim 1, further comprising associating a password with the profile.

7. The method of claim 1, further comprising:
    receiving, from a third person, a second indication regarding the identity of the first person, wherein the third person has at least the threshold level of authentication; and
    associating a second level of authentication with the profile based, at least in part, on the second indication regarding the identity of the first person.

8. The method of claim 1, further comprising prompting, during the real-time communication, either or both the first person or the second person to perform an action during the real-time communication.

9. The method of claim 8, wherein the action comprising saying a word or phrase.

10. The method of claim 1, further comprising:
    receiving, after the real-time communication, a second set of biometric information of the first person;

comparing the second set of biometric information with the first set of biometric information associated with the profile to obtain a comparison result; and granting access to the profile based, at least in part, on the comparison result.

11. A system for providing authentication based on real-time communication, the system comprising:
    means for accessing a profile comprising information regarding a first person;
    means for collecting a first set of biometric information of the first person during the real-time communication between the first person and a second person, the second person having a threshold level of authentication;
    means for associating the first set of biometric information with the profile;
    means for receiving, from the second person, an indication regarding an identity of the first person; and
    means for associating a first level of authentication with the profile based, at least in part, on the indication regarding the identity of the first person.

12. The system of claim 11, further comprising means for creating profile.

13. The system of claim 11, wherein the means for collecting the first set of biometric information includes means for collecting at least one of:
    audio information, or
    video information.

14. The system of claim 11, further comprising means for enabling the second person to send an invitation to join a social network to the first person.

15. The system of claim 11, further comprising means for enabling a third person to send an invitation to join a social network to the first person.

16. The system of claim 11, further comprising means for associating a password with the profile.

17. The system of claim 11, further comprising means for:
    receiving, from a third person, a second indication regarding the identity of the first person, wherein the third person has at least the threshold level of authentication; and
    associating a second level of authentication with the profile based, at least in part, on the second indication regarding the identity of the first person.

18. The system of claim 11, further comprising means for prompting, during the real-time communication, either or both the first person or the second person to perform an action during the real-time communication.

19. The system of claim 11, further comprising means for:
    receiving, after the real-time communication, a second set of biometric information of the first person;
    comparing the second set of biometric information with the first set of biometric information associated with the profile to obtain a comparison result; and
    granting access to the profile based, at least in part, on the comparison result.

20. A device for providing authentication based on real-time communication, the device comprising:
    a communication interface; and
    one or more processors coupled to the communication interface, the one or more processors configured to:
        access a profile comprising information regarding a first person;
        collect, via the communication interface, a first set of biometric information of the first person during real-time communication between the first person and a second person, the second person having a threshold level of authentication;
        associate the first set of biometric information with the profile;
        receive, from the second person via the communication interface, an indication regarding an identity of the first person; and
        associate a first level of authentication with the profile based, at least in part, on the indication regarding the identity of the first person.

21. The device of claim 20, wherein the one or more processors are further configured to create the profile.

22. The device of claim 20, wherein the first set of biometric information includes at least one of:
    audio information, or
    video information.

23. The device of claim 20, wherein the one or more processors are further configured to initiate the real-time communication by enabling the second person to send an invitation to join a social network to the first person.

24. The device of claim 20, wherein the one or more processors are further configured to initiate the real-time communication by enabling a third person to send an invitation to join a social network to the first person.

25. The device of claim 20, wherein the one or more processors are further configured to associate a password with the profile.

26. The device of claim 20, wherein the one or more processors are further configured to:
    receive, from a third person, a second indication regarding the identity of the first person, wherein the third person has at least the threshold level of authentication; and
    associate a second level of authentication with the profile based, at least in part, on the second indication regarding the identity of the first person.

27. The device of claim 20, wherein the one or more processors are further configured to prompt, during the real-time communication, either or both the first person or the second person to perform an action during the real-time communication.

28. The device of claim 20, wherein the one or more processors are further configured to:
    receive, after the real-time communication, a second set of biometric information of the first person;
    compare the second set of biometric information with the first set of biometric information associated with the profile to obtain a comparison result; and
    grant access to the profile based, at least in part, on the comparison result.

29. A non-transitory computer-readable recording medium having instructions embedded thereon for providing authentication based on real-time communication, the instructions including computer-executable code for:
    accessing a profile comprising information regarding a first person;
    collecting a first set of biometric information of the first person during real-time communication between the first person and a second person, the second person having a threshold level of authentication;
    associating the first set of biometric information with the profile;
    receiving, from the second person, an indication regarding an identity of the first person; and
    associating a first level of authentication with the profile based, at least in part, on the indication regarding the identity of the first person.

30. The non-transitory computer-readable recording medium of claim 29, wherein the instructions further include computer-executable code for creating the profile.

31. The non-transitory computer-readable recording medium of claim 29, wherein the code for collecting the first set of biometric information includes code for collecting at least one of:

audio information, or video information.

32. The non-transitory computer-readable recording medium of claim 29, wherein the instructions further include computer-executable code for enabling the second person to send an invitation to join a social network to the first person.

33. The non-transitory computer-readable recording medium of claim 29, wherein the instructions further include computer-executable code for enabling a third person to send an invitation to join a social network to the first person.

34. The non-transitory computer-readable recording medium of claim 29, wherein the instructions further include computer-executable code for associating a password with the profile.

35. The non-transitory computer-readable recording medium of claim 29, wherein the instructions further include computer-executable code for:

receiving, from a third person, a second indication regarding the identity of the first person, wherein the third person has at least the threshold level of authentication; and associating a second level of authentication with the profile based, at least in part, on the second indication regarding the identity of the first person.

36. The non-transitory computer-readable recording medium of claim 29, wherein the instructions further include computer-executable code for prompting, during the real-time communication, either or both the first person or the second person to perform an action during the real-time communication.

37. The non-transitory computer-readable recording medium of claim 29, wherein the instructions further include computer-executable code for:

receiving, after the real-time communication, a second set of biometric information of the first person;

comparing the second set of biometric information with the first set of biometric information associated with the profile to obtain a comparison result; and granting access to the profile based, at least in part, on the comparison result.

* * * * *